(12) United States Patent
Asanuma et al.

(10) Patent No.: US 12,286,211 B2
(45) Date of Patent: Apr. 29, 2025

(54) AIRCRAFT

(71) Applicant: HONDA MOTOR CO., LTD., Tokyo (JP)

(72) Inventors: Masahiko Asanuma, Wako (JP); Hiroki Oyama, Wako (JP); Kohei Maruyama, Wako (JP); Kazuma Yoshii, Wako (JP); Naoyuki Togo, Wako (JP); Yuji Ishitsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/257,369

(22) PCT Filed: Dec. 15, 2020

(86) PCT No.: PCT/JP2020/046755
§ 371 (c)(1),
(2) Date: Jun. 14, 2023

(87) PCT Pub. No.: WO2022/130500
PCT Pub. Date: Jun. 23, 2022

(65) Prior Publication Data
US 2024/0059393 A1    Feb. 22, 2024

(51) Int. Cl.
*B64C 1/26* (2006.01)
*B64C 29/00* (2006.01)
*B64C 39/08* (2006.01)

(52) U.S. Cl.
CPC ............ *B64C 1/26* (2013.01); *B64C 29/0025* (2013.01); *B64C 39/08* (2013.01)

(58) Field of Classification Search
CPC ....... B64C 1/26; B64C 29/0025; B64C 39/08; B64C 3/16
See application file for complete search history.

(56) References Cited

U.S. PATENT DOCUMENTS 10,081,436 B1 * 9/2018 Tian ....................... B64U 10/20
10,472,064 B2 * 11/2019 Tian ....................... B64U 50/19
11,066,161 B2 * 7/2021 Mermoz .............. B64D 27/026
(Continued)

FOREIGN PATENT DOCUMENTS

| CN | 202728575 U | 2/2013 |
| CN | 105882959 A | 8/2016 |

(Continued)

OTHER PUBLICATIONS

European Search Report from corresponding European Application No. 20965888.9, dated Nov. 16, 2023, 12 pages.
International Search Report, International Application No. PCT/JP2020/046755, Date of mailing: Mar. 2, 2021, 2 pages.
(Continued)

*Primary Examiner* — Assres H Woldemaryam
(74) *Attorney, Agent, or Firm* — Rankin, Hill & Clark LLP

(57) ABSTRACT

Four or more rotors installed on an aircraft include: a pair of first rotors that are left/right symmetrically arranged in front of a front wing about a position overlapping the central axis of a fuselage in plan view; and a pair of second rotors that are left/right symmetrically arranged between the front wing and a rear wing about a position overlapping the central axis of the fuselage in a plan view. The distance between the fuselage and the second rotors in the width direction is longer than the distance between the fuselage and the first rotors in the width direction.

6 Claims, 5 Drawing Sheets

(56) References Cited

U.S. PATENT DOCUMENTS

| | | | |
|---|---|---|---|
| 2003/0062443 A1 | 4/2003 | Wagner et al. | |
| 2011/0303795 A1 | 12/2011 | Oliver | |
| 2013/0092799 A1 | 4/2013 | Tian et al. | |
| 2015/0012154 A1* | 1/2015 | Senkel | B64D 17/80 701/4 |
| 2016/0236774 A1 | 8/2016 | Niedzballa | |
| 2019/0127056 A1* | 5/2019 | Weekes | B64D 9/00 |
| 2019/0233107 A1* | 8/2019 | Tian | B64C 39/12 |
| 2019/0337613 A1* | 11/2019 | Villa | B64C 27/26 |
| 2020/0115045 A1* | 4/2020 | Mermoz | B64C 29/0033 |
| 2020/0333779 A1 | 10/2020 | Regev | |
| 2020/0354048 A1* | 11/2020 | Melo | B64C 39/08 |
| 2020/0407055 A1* | 12/2020 | Mores | B64U 70/60 |
| 2021/0070431 A1 | 3/2021 | NakaMats | |
| 2023/0036722 A1* | 2/2023 | Hanamitsu | B64D 27/359 |

FOREIGN PATENT DOCUMENTS

| | | |
|---|---|---|
| CN | 206417197 U | 8/2017 |
| CN | 108438204 A | 8/2018 |
| CN | 211253017 U | 8/2020 |
| CN | 111907698 A | 11/2020 |
| JP | 2014-528382 A | 10/2014 |
| JP | 2014-218105 A | 11/2014 |
| JP | 2019-181965 A | 10/2019 |
| JP | 2020-526436 A | 8/2020 |

OTHER PUBLICATIONS

Chinese Office Action and Dearch Report dated Mar. 14, 2025, issued in corresponding Chinese Application No. 202080107972.4; English machine translation included; 24 pages.

* cited by examiner

AIRCRAFT

TECHNICAL FIELD

The present invention relates to an aircraft capable of taking off and landing in a vertical direction and of cruising.

BACKGROUND ART

US 2020/0115045 A1 discloses an aircraft referred to as a vertical take-off and landing (VTOL) aircraft. The aircraft disclosed in US 2020/0115045 A1 includes a fuselage, a front wing and a rear wing (main wing) connected to the fuselage, a plurality of takeoff and landing rotors disposed on the left and right sides of the fuselage, and a plurality of cruise rotors disposed above the rear wing. This aircraft uses the takeoff and landing rotors during takeoff and landing and during hovering, and uses the cruise rotors during cruising. In addition, this aircraft uses both the takeoff and landing rotors and the cruise rotors when transitioning from hovering to cruising and when transitioning from cruising to hovering.

In this aircraft, two takeoff and landing rotors arranged on the left and right sides of the fuselage form a pair. For example, this aircraft includes a pair of takeoff and landing rotors disposed forward of the front wing or at both ends of the front wing, one or more pairs of takeoff and landing rotors disposed between the front wing and the rear wing, and a pair of takeoff and landing rotors disposed rearward of the rear wing.

SUMMARY OF THE INVENTION

When air flows to the wing from the front, lift is generated. In general, a main wing of an aircraft is configured to generate a large lift at a portion close to a fuselage. Therefore, a large lift can be obtained by smoothly guiding the air flowing from the front, to the vicinity of a connection portion between the main wing and the fuselage.

In the aircraft disclosed in US 2020/0115045 A1, a pair of takeoff and landing rotors are disposed forward of the rear wing (main wing) and close to the fuselage. When the takeoff and landing rotors and the cruise rotors are used together in this aircraft, the pair of takeoff and landing rotors disposed forward of the rear wing generates, in front of the rear wing, an air flow flowing from above to below. This air flow interferes with the flow of air guided from the front side of the rear wing to the vicinity of the connection portion between the rear wing and the fuselage. Then, the flow of the air guided to the vicinity of the connection portion between the rear wing and the fuselage may be disturbed, and the lift generated by the rear wing may be reduced.

The present invention has been made in view of such a problem, and an object thereof is to provide an aircraft capable of suppressing a decrease in lift generated by a wing when moving in a horizontal direction while using takeoff and landing rotors.

According to a first aspect of the present invention, there is provided an aircraft comprising: a fuselage; a front wing connected to a front portion of the fuselage and configured to generate lift when the aircraft moves in a horizontal direction; a rear wing connected to a rear portion of the fuselage and configured to generate lift when the aircraft moves in the horizontal direction; and four or more rotors configured to generate lift, wherein the four or more rotors include: a pair of first rotors disposed forward of the front wing so as to be bilaterally symmetrical about a position overlapping a central axis of the fuselage in plan view; and a pair of second rotors disposed between the front wing and the rear wing so as to be bilaterally symmetrical about the position overlapping the central axis of the fuselage in the plan view, and wherein a distance between the fuselage and each of the second rotors in a width direction is longer than a distance between the fuselage and each of the first rotors in the width direction.

According to a second aspect of the present invention, there is provided an aircraft comprising: a fuselage; a front wing connected to a front portion of the fuselage and configured to generate lift when the aircraft moves in a horizontal direction; a rear wing connected to a rear portion of the fuselage and configured to generate lift when the aircraft moves in the horizontal direction; and four or more rotors configured to generate lift, wherein the four or more rotors include a pair of first rotors and a pair of second rotors, the pair of first rotors and the pair of second rotors each being disposed so as to be bilaterally symmetrical about a position overlapping a central axis of the fuselage in plan view, and wherein a distance, in a front-rear direction, between a center position of the rear wing and a center position between the pair of second rotors is shorter than a distance, in the front-rear direction, between the center position of the rear wing and a center position between the pair of first rotors, and a distance between the fuselage and each of the second rotors in a width direction is longer than a distance between the fuselage and each of the first rotors in the width direction.

According to a third aspect of the present invention, there is provided an aircraft comprising: a fuselage; a front wing connected to a front portion of the fuselage and configured to generate lift when the aircraft moves in a horizontal direction; a rear wing connected to a rear portion of the fuselage and configured to generate lift when the aircraft moves in the horizontal direction; and six or more rotors configured to generate lift, wherein the six or more rotors include: a pair of first rotors disposed forward of the front wing so as to be bilaterally symmetrical about a position overlapping a central axis of the fuselage in plan view; a pair of second rotors disposed between the front wing and the rear wing so as to be bilaterally symmetrical about the position overlapping the central axis of the fuselage in the plan view; and a pair of third rotors disposed rearward of the rear wing so as to be bilaterally symmetrical about the position overlapping the central axis of the fuselage in the plan view, and wherein a distance between the pair of second rotors is longer than a distance between the pair of first rotors and a distance between the pair of third rotors.

According to each aspect of the present invention, it is possible to suppress a decrease in lift generated by the rear wing due to the operation of the second rotors.

DETAILED DESCRIPTION OF THE INVENTION

A preferred embodiment of an aircraft according to the present invention will be presented and described in detail below with reference to the accompanying drawings.

1. Overall Configuration of Aircraft 10

In the present embodiment, an aircraft 10 is assumed to be an electric vertical take-off and landing (eVTOL) aircraft that generates lift and thrust using rotors each including an electric motor. In this specification, a vertically upward direction is referred to as an upward direction (upward), and a vertically downward direction is referred to as a downward direction (downward). Further, a moving direction of the aircraft 10 when the aircraft 10 moves (flies) in the horizontal direction is referred to as a forward direction (forward), and a direction opposite thereto is referred to as a rearward direction (rearward). Further, in a state of facing forward from the aircraft 10, a direction toward the right side in the width direction of the aircraft 10 is referred to as a right direction (rightward), and a direction toward the left side in the width direction is referred to as a left direction (leftward). Further, the plan view of the aircraft 10 refers to a view in which the respective components are viewed from a position directly above the aircraft 10. The front view of the aircraft 10 refers to a view in which the respective components are viewed from a position in front of the aircraft 10.

Figure 1:
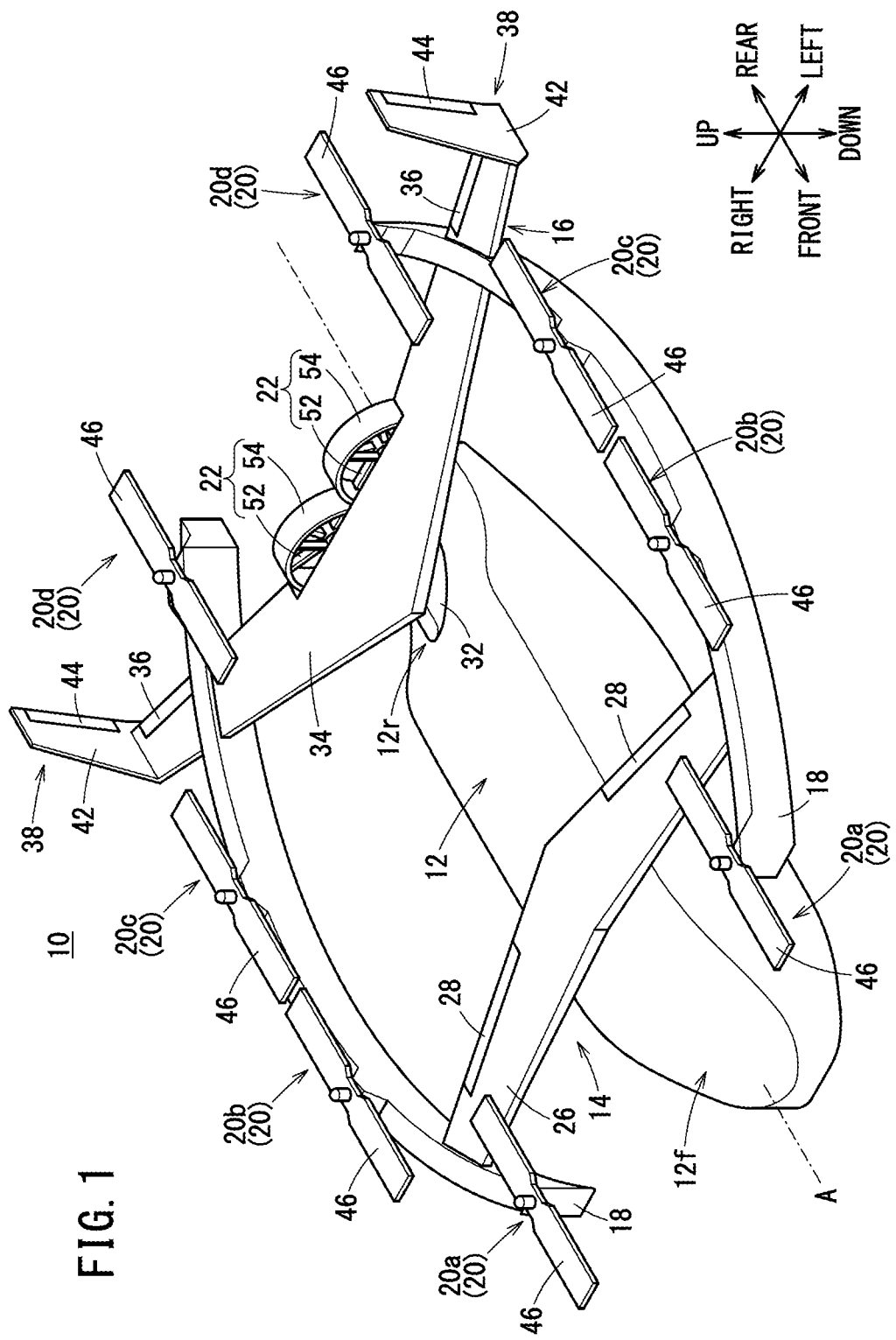
FIG. 1 is a perspective view of an aircraft according to a present embodiment.
Figure 2:
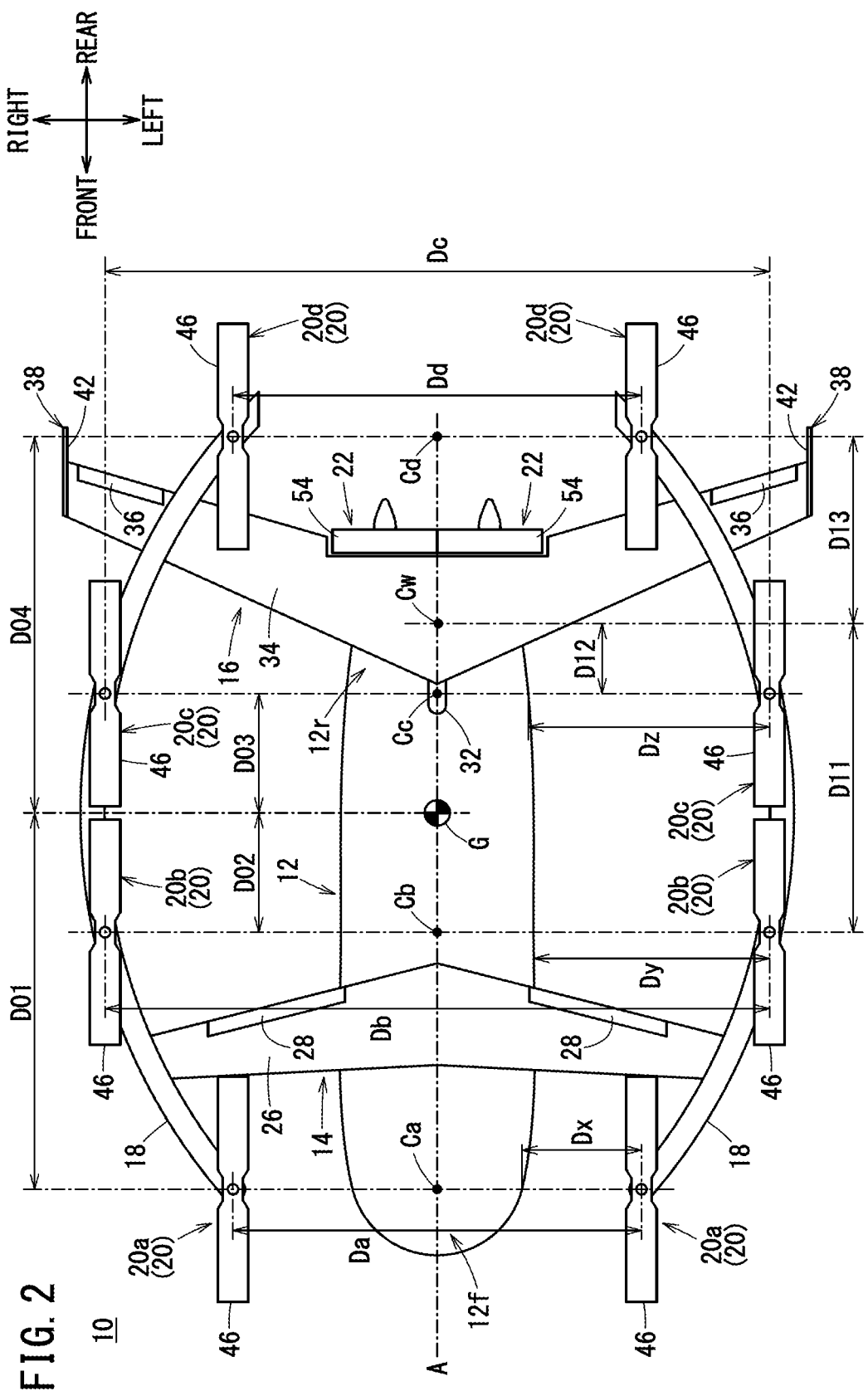
FIG. 2 is a plan view of the aircraft according to the present embodiment.

The aircraft 10 includes a fuselage 12, a front wing 14, a rear wing 16, two booms 18, eight takeoff and landing rotors 20, and two cruise rotors 22. As shown in FIG. 2, the structure of the aircraft 10 in plan view is bilaterally symmetrical about a position overlapping a central axis A of the fuselage 12 extending in the front-rear direction. In plan view, the central axis A overlaps a center of gravity G of the aircraft 10.

The fuselage 12 is long in the front-rear direction. The fuselage 12 includes a front portion 12$f$ located forward of the center of gravity G, and a rear portion 12$r$ located rearward of the center of gravity G. The front portion 12$f$ is configured such that the front end thereof is narrow. The rear portion 12$r$ is configured such that the rear end thereof is narrow. The main body of the fuselage 12 may be partially covered with a fairing. In this specification, the fuselage 12, the front portion 12$f$, and the rear portion 12$r$ are referred to as such, including the fairing.

The front wing 14 is connected to an upper portion of the front portion 12$f$ of the fuselage 12 and is configured to generate lift when the aircraft 10 moves forward. The front wing 14 includes a front wing main body (also referred to as a horizontal stabilizer) 26 extending to the left and right (laterally) from the center, and left and right elevators 28 disposed at the trailing edge of the front wing 14.

The rear wing 16 is connected to an upper portion of the rear portion 12$r$ of the fuselage 12 via a pylon 32 and is configured to generate lift when the aircraft 10 moves forward. The rear wing 16 includes a rear wing main body 34 extending laterally rearward from the center, left and right elevons 36 disposed at the trailing edge of the rear wing 16, and a pair of vertical tails 38 disposed at left and right wing tips of the rear wing 16. Each vertical tail 38 includes a tail main body 42 (also referred to as a vertical stabilizer), and a rudder 44 disposed at the trailing edge of the vertical tail 38.

The wing area of the rear wing 16 is larger than the wing area of the front wing 14. Further, the wing width of the rear wing 16 is greater than the wing width of the front wing 14. With such a configuration, when the aircraft 10 moves forward, the lift generated by the rear wing 16 is larger than the lift generated by the front wing 14. That is, the rear wing 16 functions as a main wing of the aircraft 10. The rear wing 16 is a swept wing that reduces air resistance. On the other hand, the front wing 14 functions as a canard wing of the aircraft 10. The front wing 14 and the rear wing 16 also function as support members for supporting the two booms 18.

Note that the lift generated by the rear wing 16 when the aircraft 10 moves forward and the lift generated by the front wing 14 when the aircraft 10 moves forward may be substantially the same. The magnitude relationship between the lift generated by the front wing 14 and the lift generated by the rear wing 16 is appropriately determined depending on the position of the center of gravity G, the attitude of the fuselage during cruising, and the like. Further, the size (the wing area, the length, and the like) of each of the front wing 14 and the rear wing 16 is determined so as to generate a desired lift.

The two booms 18 include a right boom 18 disposed on the right side of the fuselage 12, and a left boom 18 disposed on the left side of the fuselage 12. The two booms 18 form a pair and are arranged so as to be bilaterally symmetrical about a position overlapping the central axis A of the fuselage 12 in plan view. The two booms 18 function as support members for supporting the takeoff and landing rotors 20.

The right boom 18 is a bar member that extends from the front toward the rear and is curved rightward (outward in the width direction) in an arc shape. The right boom 18 is connected to the right wing tip of the front wing 14 and is connected to the right wing of the rear wing 16 on the inner side of the elevon 36. The front end of the right boom 18 is located forward of the front wing 14. The rear end of the right boom 18 is located rearward of the rear wing 16.

The left boom 18 is a bar member that extends from the front toward the rear and is curved leftward (outward in the width direction) in an arc shape. The left boom 18 is connected to the left wing tip of the front wing 14 and is connected to the left wing of the rear wing 16 on the inner side of the elevon 36. The front end of the left boom 18 is located forward of the front wing 14. The rear end of the left boom 18 is located rearward of the rear wing 16.

The takeoff and landing rotors 20 each include a rotating mast (not shown) connected to an output shaft of an electric motor (not shown), and a propeller 46 attached to the rotating mast. The rotating mast is disposed so as to be parallel to the up-down direction and is rotatable about an axis extending in the up-down direction. The propeller 46 is located above the boom 18, the front wing 14, and the rear wing 16. With such a structure, the propeller 46 is rotatable about an axis extending in the up-down direction. Each takeoff and landing rotor 20 generates lift by rotation of the propeller 46.

The eight takeoff and landing rotors 20 include four takeoff and landing rotors 20$a$ to 20$d$ disposed on the right side of the fuselage 12, and four takeoff and landing rotors 20$a$ to 20$d$ disposed on the left side of the fuselage 12. The right-side takeoff and landing rotors 20$a$ to 20$d$ are supported by the right boom 18. The left-side takeoff and landing rotors 20$a$ to 20$d$ are supported by the left boom 18. Each of the right-side takeoff and landing rotors 20$a$ to 20$d$ and each of the left-side takeoff and landing rotors 20$a$ to 20d form a pair, the position of each right-side takeoff and landing rotor and the position of the left-side takeoff and landing rotor paired with this right-side takeoff and landing rotor being the same in the front-rear direction.

Figure 4:
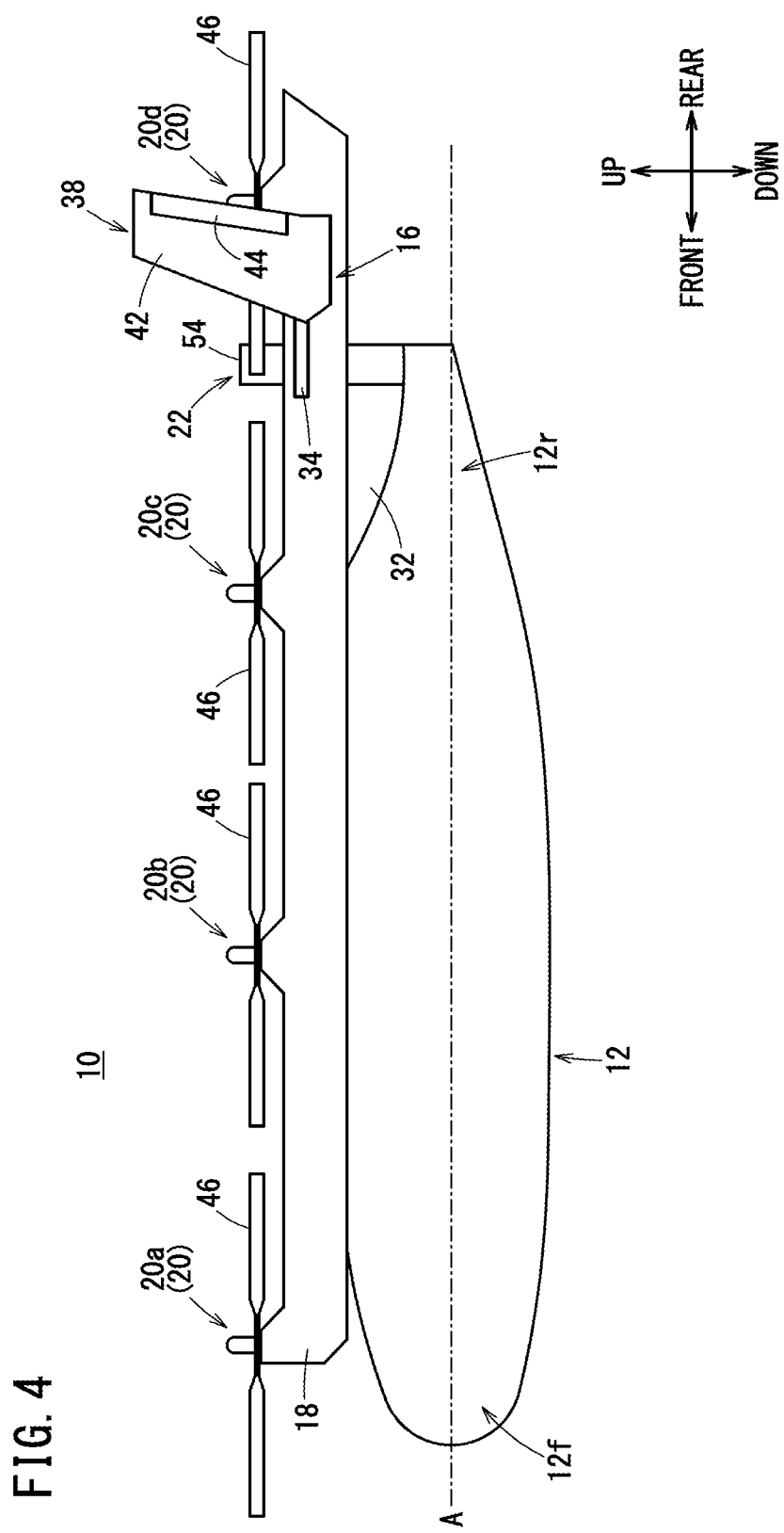
FIG. 4 is a left side view of the aircraft according to the present embodiment.

As shown in FIG. 2, the pair of takeoff and landing rotors 20a, the front wing 14, the pair of takeoff and landing rotors 20b, the pair of takeoff and landing rotors 20c, the rear wing 16, and the pair of takeoff and landing rotors 20d are arranged in this order from the front toward the rear in plan view. In other words, the pair of takeoff and landing rotors 20a are disposed forward of the front wing 14. Further, the pair of takeoff and landing rotors 20b are disposed between the front wing 14 and the rear wing 16, and are disposed forward of the pair of takeoff and landing rotors 20c. Furthermore, the pair of takeoff and landing rotors 20c are disposed between the front wing 14 and the rear wing 16, and are disposed rearward of the pair of takeoff and landing rotors 20b. The pair of takeoff and landing rotors 20d are disposed rearward of the rear wing 16. As shown in FIG. 4, the takeoff and landing rotors 20a to 20d are disposed at the same height position.

Here, as shown in FIG. 2, a distance between the fuselage 12 and each takeoff and landing rotor 20a in the width direction is defined as Dx. A distance between the fuselage 12 and each takeoff and landing rotor 20b in the width direction is defined as Dy. A distance between the fuselage 12 and each takeoff and landing rotor 20c in the width direction is defined as Dz. Note that the start point (or end point) of each of the distances Dx to Dz on the fuselage 12 side is a position on the outermost side of the outer surface of the fuselage 12 in plan view. Further, the start point (or end point) of each of the distances Dx to Dz on the takeoff and landing rotor 20 side is the position of the axis of the propeller 46.

In the present embodiment, the takeoff and landing rotors 20 are arranged so that the following first condition and second condition are satisfied.

first condition: $Dx<Dy$, $Dx<Dz$
second condition: $Dy=Dz$

Note that the takeoff and landing rotors 20 may be arranged so that the following third condition is satisfied instead of the second condition.

third condition: $Dy<Dz$

Here, as shown in FIG. 2, a distance between the pair of takeoff and landing rotors 20a is defined as Da. A distance between the pair of takeoff and landing rotors 20b is defined as db. A distance between the pair of takeoff and landing rotors 20c is defined as Dc. A distance between the pair of takeoff and landing rotors 20d is defined as Dd. The start point and the end point of each of the distances Da to Dd are the positions of the axes of the propellers 46.

In the present embodiment, the takeoff and landing rotors 20 are arranged so that the following fourth condition and fifth condition are satisfied in addition to the first to third conditions.

fourth condition: $Da<db$, $Da<Dc$, $Dd<db$, $Dd<Dc$
fifth condition: $Da=Dd$, $db=Dc$ Note that the takeoff and landing rotors 20 may be arranged so that the following sixth condition is satisfied instead of the fifth condition.

sixth condition: $Da=Dd$, $db<Dc$

In plan view, a center position Ca between the pair of takeoff and landing rotors 20a and a center position Cb between the pair of takeoff and landing rotors 20b are located forward of the center of gravity G. Further, in plan view, a center position Cc between the pair of takeoff and landing rotors 20c and a center position Cd between the pair of takeoff and landing rotors 20d are located rearward of the center of gravity G.

Here, as shown in FIG. 2, in plan view, a distance between the center of gravity G and the center position Ca between the pair of takeoff and landing rotors 20a is defined as D01. In plan view, a distance between the center of gravity G and the center position Cb between the pair of takeoff and landing rotors 20b is defined as D02. In plan view, a distance between the center of gravity G and the center position Cc between the pair of takeoff and landing rotors 20c is defined as D03. In plan view, a distance between the center of gravity G and the center position Cd between the pair of takeoff and landing rotors 20d is defined as D04.

In the present embodiment, the takeoff and landing rotors 20 are arranged so that the following seventh condition is satisfied in addition to the first to sixth conditions.

seventh condition: $D02<D01$, $D03<D01$, $D02<D04$, $D03<D04$

Here, as shown in FIG. 2, in plan view, a distance between a center position Cw of the rear wing 16 and the center position Cb between the pair of takeoff and landing rotors 20b is defined as D11. In plan view, a distance between the center position Cw of the rear wing 16 and the center position Cc between the pair of takeoff and landing rotors 20c is defined as D12. In plan view, a distance between the center position Cw of the rear wing 16 and the center position Cd between the pair of takeoff and landing rotors 20d is defined as D13. The center position Cw of the rear wing 16 may be a center position, in the front-rear direction, of the center line of the rear wing 16 extending in the front-rear direction, or may be the center of gravity of the rear wing 16.

In the present embodiment, the takeoff and landing rotors 20 are arranged so that the following eighth condition is satisfied in addition to the first to seventh conditions.

eighth condition: $D12<D11$, $D12<D13$

Figure 3:
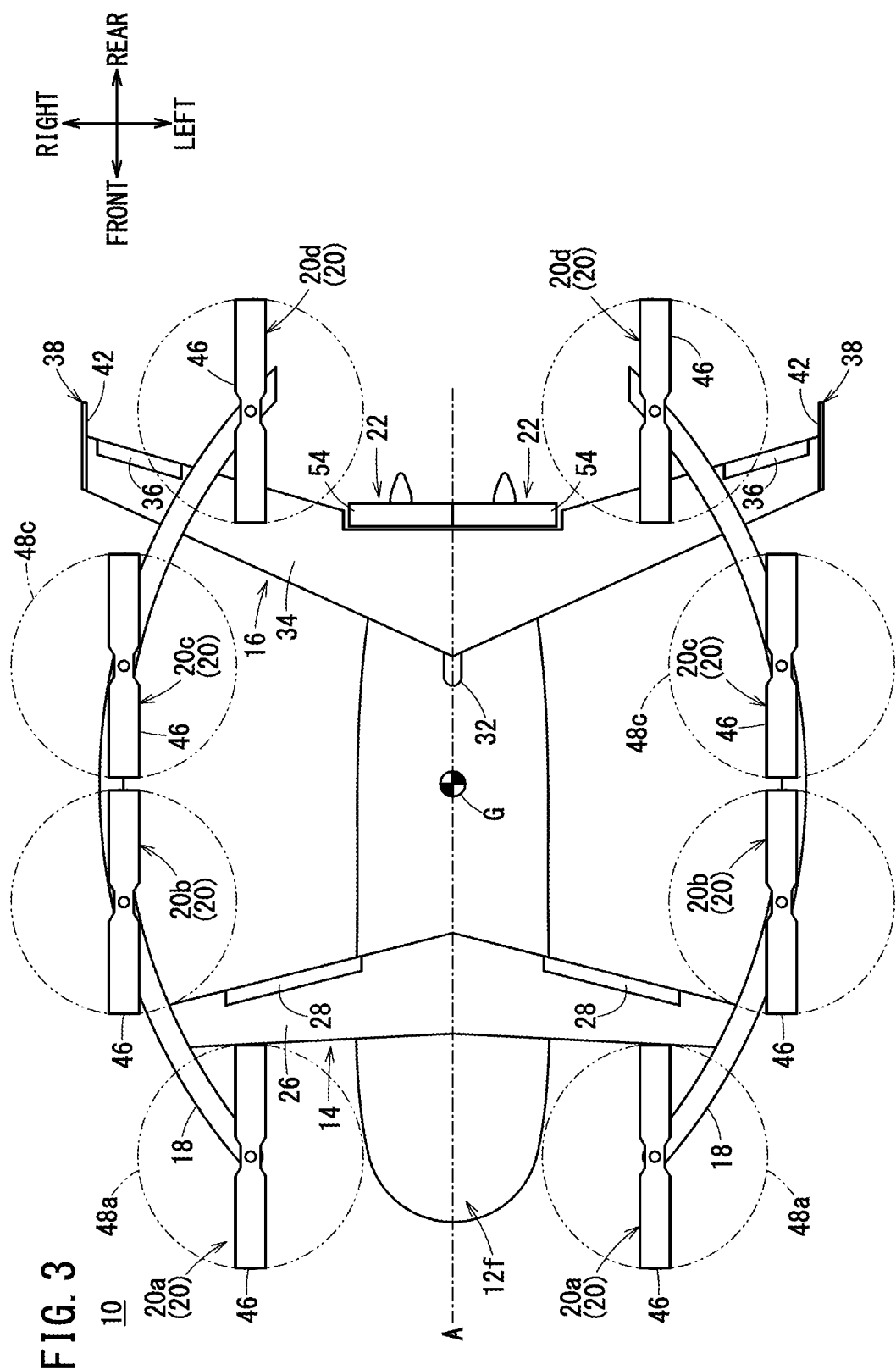
FIG. 3 is a plan view showing a rotation range of a propeller of each takeoff and landing rotor.

As shown in FIG. 3, the pair of takeoff and landing rotors 20a are disposed immediately forward of the front wing 14 in plan view. In plan view, a rotation range 48a of the propeller 46 of each of the takeoff and landing rotors 20a is in contact with or separated from the leading edge of the front wing 14. Further, the pair of takeoff and landing rotors 20c are disposed immediately forward of the rear wing 16 in plan view. In plan view, a rotation range 48c of the propeller 46 of each of the takeoff and landing rotors 20c is in contact with or separated from the leading edge of the rear wing 16. In this manner, according to the present embodiment, the rotation ranges 48a and 48c of the propellers 46 of the takeoff and landing rotors 20a and 20c disposed forward of the wings do not overlap the wings in plan view.

The two cruise rotors 22 are disposed on the rear portion 12r of the fuselage 12. The position of each cruise rotor 22 in the left-right direction is on the inner side (the fuselage 12 side) of the position of each pair of takeoff and landing rotors 20 in the left-right direction. Further, the position of each cruise rotor 22 in the front-rear direction is between the pair of takeoff and landing rotors 20c and the pair of takeoff and landing rotors 20d. Furthermore, the position of the axis of each cruise rotor 22 in the up-down direction is lower than the position of the propeller 46 of each takeoff and landing rotor 20 in the up-down direction.

Figure 5:
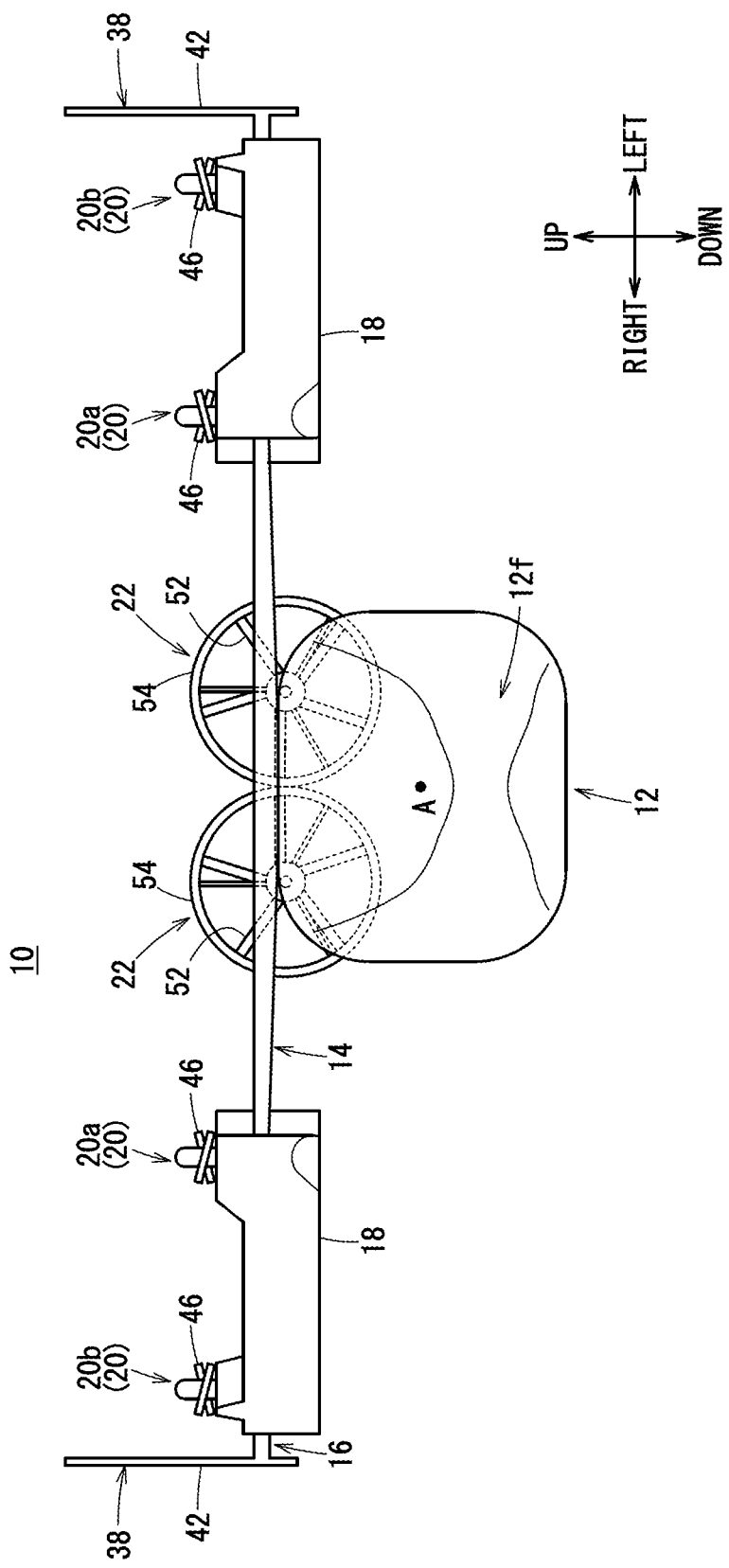
FIG. 5 is a front view of the aircraft according to the present embodiment.

As shown in FIG. 5, the cruise rotors 22 each include a rotating mast (not shown) connected to an output shaft of an electric motor (not shown), a propeller 52 attached to a front end portion of the rotating mast, and a cylindrical duct 54 surrounding the propeller 52. The positions of the two cruise rotors 22 coincide with each other in both the front-rear direction and the up-down direction. Further, the two cruise rotors 22 are arranged side by side in the left-right direction. One of the cruise rotors 22 is disposed on the right side of a position overlapping the central axis A of the fuselage 12 in plan view, and is supported by the right wing of the rear wing 16. The other cruise rotor 22 is disposed on the left side of the position overlapping the central axis A of the fuselage 12 in plan view, and is supported by the left wing of the rear wing 16. The rotating mast is located below the rear wing 16 so as to be parallel to the front-rear direction, and is rotatable about an axis extending in the front-rear direction. With such a structure, the propeller 52 is rotatable about an axis extending in the front-rear direction. Each cruise rotor 22 generates thrust by rotation of the propeller 52.

2. Relationship Between Flight State and Rotor Used

The takeoff and landing rotors 20 are used when the aircraft 10 takes off, lands, and hovers. On the other hand, the cruise rotors 22 are used when the aircraft 10 is cruising. Further, the takeoff and landing rotors 20 and the cruise rotors 22 are used together when the aircraft 10 transitions from hovering to cruising and moves forward at a first speed (≥0 km/h) or more and less than a second speed (>first speed). In this case, the usage rate of the cruise rotors 22 is gradually increased for acceleration. Since the lift generated by the wing increases with acceleration, the usage rate of the takeoff and landing rotors 20 is gradually decreased. For example, the usage rate of the takeoff and landing rotors 20 is decreased by decreasing the rotational speed of the takeoff and landing rotors 20 to reduce the lift. Alternatively, the usage rate of the takeoff and landing rotors 20 is decreased by changing the pitch angle of respective blades to reduce the lift.

In addition, the takeoff and landing rotors 20 and the cruise rotors 22 are used together when the aircraft 10 transitions from cruising to hovering and moves forward at a third speed (≥0 km/h) or more and less than a fourth speed (>third speed). In this case, the usage rate of the cruise rotors 22 is gradually decreased for deceleration. Since the lift generated by the wing decreases with deceleration, the usage rate of the takeoff and landing rotors 20 is gradually increased. For example, the usage rate of the takeoff and landing rotors 20 is increased by increasing the rotational speed of the takeoff and landing rotors 20 to increase the lift. Alternatively, the usage rate of the takeoff and landing rotors 20 is increased by changing the pitch angle of respective blades to increase the lift.

3. Modifications of Aircraft 10

[3.1. Modification 1]

The aircraft 10 may include four takeoff and landing rotors 20, namely, two pairs of takeoff and landing rotors 20. In this case, the first pair of takeoff and landing rotors 20 are disposed forward of the front wing 14 in plan view. Further, the second pair of takeoff and landing rotors 20 are disposed between the front wing 14 and the rear wing 16 in plan view.

In the same manner as in the above-described embodiment, in the first modification, the takeoff and landing rotors 20 are arranged so that the distance, in the width direction, between the fuselage 12 and each of the takeoff and landing rotors 20 disposed between the front wing 14 and the rear wing 16 is longer than the distance, in the width direction, between the fuselage 12 and each of the takeoff and landing rotors 20 disposed forward of the front wing 14.

[3.2. Modification 2]

The aircraft 10 may include six takeoff and landing rotors 20, namely, three pairs of takeoff and landing rotors 20. In this case, the first pair of takeoff and landing rotors 20 are disposed forward of the front wing 14 in plan view. Further, the second pair of takeoff and landing rotors 20 are disposed between the front wing 14 and the rear wing 16 in plan view. Furthermore, the third pair of takeoff and landing rotors 20 are disposed rearward of the rear wing 16 in plan view.

In the same manner as in the above-described embodiment, in the second modification, the takeoff and landing rotors 20 are arranged so that the distance, in the width direction, between the fuselage 12 and each of the takeoff and landing rotors 20 disposed between the front wing 14 and the rear wing 16 is longer than the distance, in the width direction, between the fuselage 12 and each of the takeoff and landing rotors 20 disposed forward of the front wing 14.

Further, the takeoff and landing rotors 20 are arranged so that the distance between the second pair of takeoff and landing rotors 20 disposed between the front wing 14 and the rear wing 16 is longer than the distance between the first pair of takeoff and landing rotors 20 disposed forward of the front wing 14 and the distance between the third pair of takeoff and landing rotors 20 disposed rearward of the rear wing 16.

[3.3. Modification 3]

The aircraft 10 may include ten or more takeoff and landing rotors 20, namely, five or more pairs of takeoff and landing rotors 20. In this case, at least one pair of takeoff and landing rotors 20 are disposed forward of the front wing 14 in plan view. Further, at least one pair of takeoff and landing rotors 20 are disposed between the front wing 14 and the rear wing 16 in plan view. Furthermore, at least one pair of takeoff and landing rotors 20 are disposed rearward of the rear wing 16 in plan view.

In the same manner as in the above-described embodiment, in the third modification, the takeoff and landing rotors 20 are arranged so that the distance, in the width direction, between the fuselage 12 and each of the takeoff and landing rotors 20 disposed between the front wing 14 and the rear wing 16 is longer than the distance, in the width direction, between the fuselage 12 and each of the takeoff and landing rotors 20 disposed forward of the front wing 14.

Further, the takeoff and landing rotors 20 are arranged so that the distance between the pair of takeoff and landing rotors 20 disposed between the front wing 14 and the rear wing 16 is longer than the distance between the pair of takeoff and landing rotors 20 disposed forward of the front wing 14 and the distance between the pair of takeoff and landing rotors 20 disposed rearward of the rear wing 16.

4. Technical Idea Obtained from Embodiment

The technical idea that can be grasped from the above embodiment will be described below.

According to the first aspect of the present invention, provided is the aircraft 10 including: the fuselage 12; the front wing 14 connected to the front portion 12$f$ of the fuselage 12 and configured to generate lift when the aircraft moves in the horizontal direction; the rear wing 16 connected to the rear portion 12$r$ of the fuselage 12 and configured to generate lift when the aircraft moves in the horizontal direction; and four or more rotors (the takeoff and landing rotors 20) configured to generate lift, wherein the four or more rotors include: the pair of first rotors (the takeoff and landing rotors 20a) disposed forward of the front wing 14 so as to be bilaterally symmetrical about the position overlapping the central axis A of the fuselage 12 in plan view; and the pair of second rotors (the takeoff and landing rotors 20b, 20c) disposed between the front wing 14 and the rear wing 16 so as to be bilaterally symmetrical about the position overlapping the central axis A of the fuselage 12 in plan view, and wherein the distance (Dy, Dz) between the fuselage 12 and each of the second rotors in the width direction is longer than the distance (Dx) between the fuselage 12 and each of the first rotors in the width direction.

According to the above configuration, it is possible to suppress a decrease in the lift generated by the rear wing 16 due to the operation of the second rotors (the takeoff and landing rotors 20b, 20c) for the following reason. When the aircraft 10 moves in the horizontal direction while using the second rotors (for example, when transitioning from hovering to cruising), a downward air flow is generated in accordance with the operation of the second rotors, and air is guided from the front to the rear wing 16 in accordance with the movement in the horizontal direction. In the above configuration, at least the distance (Dy, Dz) between the fuselage 12 and each second rotor in the width direction is longer than the distance (Dx) between the fuselage 12 and each first rotor (the takeoff and landing rotor 20a) in the width direction. That is, a relatively large space is formed between the fuselage 12 and each second rotor. Accordingly, the flow of air guided from the front to the vicinity of the connection portion between the rear wing 16 and the fuselage 12 does not interfere with the downward air flow generated in accordance with the operation of the second rotors. Therefore, according to the above configuration, it is possible to smoothly guide the air flowing from the front, to the vicinity of the connection portion between the rear wing 16 and the fuselage 12 where the largest lift is generated, and as a result, it is possible to suppress a decrease in the lift generated by the rear wing 16.

In the first aspect of the present invention, the distance (db, Dc) between the pair of second rotors may be longer than the distance (Da) between the pair of first rotors.

In the first aspect of the present invention, the center of gravity G of the aircraft 10 may be located between the front wing 14 and the rear wing 16, and the distance (D02, D03), in the front-rear direction, between the center of gravity G and the center position Cb, Cc between the pair of second rotors may be shorter than the distance (D01), in the front-rear direction, between the center of gravity G and the center position Ca between the pair of first rotors.

According to the above configuration, the attitude of the aircraft 10 can be stabilized for the following reason. As the distance between the rotor for generating lift and the center of gravity G of the aircraft 10 increases, the moment of the lift about the center of gravity G increases. In the above configuration, the pair of first rotors (the takeoff and landing rotors 20a) are disposed farther from the center of gravity G than the pair of second rotors (the takeoff and landing rotors 20b, 20c). Therefore, the moment of the lift about the center of gravity G generated by the pair of first rotors is larger than the moment of the lift about the center of gravity G generated by the pair of second rotors. Further, the moment in the roll direction increases as the distance between the pair of first rotors and the fuselage 12 increases. In the above configuration, the pair of first rotors disposed away from the center of gravity G are closer to the fuselage 12 than the pair of second rotors disposed close to the center of gravity G. That is, the fuselage 12 and each first rotor are relatively close to each other. Therefore, the moment in the roll direction is relatively small. Thus, according to the above configuration, the attitude of the aircraft 10 can be stabilized.

In the first aspect of the present invention, the aircraft may include the pair of bar members (the booms 18) disposed so as to be bilaterally symmetrical about the position overlapping the central axis A of the fuselage 12 in plan view, and the pair of bar members may be connected to the front wing 14 and the rear wing 16, may be curved outward in the width direction, and may support the pair of first rotors and the pair of second rotors.

According to the above configuration, since both the front wing 14 and the rear wing 16 support the bar members (the booms 18), it is not necessary to increase the rigidity of the bar members compared to a case where only one of the front wing 14 or the rear wing 16 supports the bar members.

In the first aspect of the present invention, the rear wing 16 may be a swept wing, and the wing area of the rear wing 16 may be larger than the wing area of the front wing 14, or the wing width of the rear wing 16 may be greater than the wing width of the front wing 14.

According to the above configuration, since the rear wing 16 is a swept wing, disposing each second rotor (the takeoff and landing rotor 20c) on the outer side in the width direction makes it easier to separate the rotation range 48c of the propeller 46 of the second rotor and the leading edge of the rear wing 16 from each other in the front-rear direction in plan view. Therefore, the downward air flow generated in accordance with the operation of the second rotors is less likely to interfere with the rear wing 16.

According to the second aspect of the present invention, provided is the aircraft 10 including: the fuselage 12; the front wing 14 connected to the front portion 12f of the fuselage 12 and configured to generate lift when the aircraft moves in the horizontal direction; the rear wing 16 connected to the rear portion 12r of the fuselage 12 and configured to generate lift when the aircraft moves in the horizontal direction; and four or more rotors (the takeoff and landing rotors 20) configured to generate lift, wherein the four or more rotors include the pair of first rotors (the takeoff and landing rotors 20b) and the pair of second rotors (the takeoff and landing rotors 20c), the pair of first rotors and the pair of second rotors each being disposed so as to be bilaterally symmetrical about the position overlapping the central axis A of the fuselage 12 in plan view, and wherein the distance (D12), in the front-rear direction, between the center position Cw of the rear wing 16 and the center position Cc between the pair of second rotors is shorter than the distance (D11), in the front-rear direction, between the center position Cw of the rear wing 16 and the center position Cb between the pair of first rotors, and the distance (Dz) between the fuselage 12 and each of the second rotors in the width direction is longer than the distance (Dy) between the fuselage 12 and each of the first rotors in the width direction.

In the above configuration, at least the distance (Dz) between the fuselage 12 and each second rotor (the takeoff and landing rotor 20c) in the width direction is longer than the distance (Dy) between the fuselage 12 and each first rotor (the takeoff and landing rotor 20b) in the width direction. That is, a relatively large space is formed between the fuselage 12 and each second rotor. Accordingly, the flow of air guided from the front to the vicinity of the connection portion between the rear wing 16 and the fuselage 12 does not interfere with the downward air flow generated in accordance with the operation of the second rotors. Therefore, according to the above configuration, it is possible to smoothly guide the air flowing from the front, to the vicinity of the connection portion between the rear wing 16 and the fuselage 12 where the largest lift is generated, and as a result, it is possible to suppress a decrease in the lift generated by the rear wing 16.

According to the third aspect of the present invention, provided is the aircraft 10 including: the fuselage 12; the front wing 14 connected to the front portion 12f of the fuselage 12 and configured to generate lift when the aircraft moves in the horizontal direction; the rear wing 16 connected to the rear portion 12r of the fuselage 12 and configured to generate lift when the aircraft moves in the horizontal direction; and six or more rotors (the takeoff and landing rotors 20) configured to generate lift, wherein the six or more rotors include: the pair of first rotors (the takeoff and landing rotors 20a) disposed forward of the front wing 14 so as to be bilaterally symmetrical about the position overlapping the central axis A of the fuselage 12 in plan view; the pair of second rotors (the takeoff and landing rotors 20b, 20c) disposed between the front wing 14 and the rear wing 16 so as to be bilaterally symmetrical about the position overlapping the central axis A of the fuselage 12 in plan view; and the pair of third rotors (the takeoff and landing rotors 20d) disposed rearward of the rear wing 16 so as to be bilaterally symmetrical about the position overlapping the central axis A of the fuselage 12 in plan view, and wherein the distance (db, Dc) between the pair of second rotors is longer than the distance (Da) between the pair of first rotors and the distance (Dd) between the pair of third rotors.

In the above configuration, at least the distance (db, Dc) between the pair of second rotors (the takeoff and landing rotors 20b, 20c) is longer than the distance (Da) between the pair of first rotors (the takeoff and landing rotors 20a) and the distance (Dd) between the pair of third rotors (the takeoff and landing rotors 20d). That is, a relatively large space is formed between the fuselage 12 and each second rotor. Accordingly, the flow of air guided from the front to the vicinity of the connection portion between the rear wing 16 and the fuselage 12 does not interfere with the downward air flow generated in accordance with the operation of the second rotors. Therefore, according to the above configuration, it is possible to smoothly guide the air flowing from the front, to the vicinity of the connection portion between the rear wing 16 and the fuselage 12 where the largest lift is generated, and as a result, it is possible to suppress a decrease in the lift generated by the rear wing 16.

In addition, according to the above configuration, the width of the aircraft 10 on the front side and the rear side thereof can be reduced. Accordingly, the aircraft 10 can be stored in a small space.

The aircraft according to the present invention is not limited to the above disclosure, and various configurations could be adopted therein without departing from the essence and gist of the present invention.

The invention claimed is:

1. An aircraft comprising:
a fuselage;
a front wing connected to a front portion of the fuselage and configured to generate lift when the aircraft moves in a horizontal direction;
a rear wing connected to a rear portion of the fuselage and configured to generate lift when the aircraft moves in the horizontal direction;
four or more rotors configured to generate lift;
a pair of bar members disposed so as to be bilaterally symmetrical about a position overlapping a central axis of the fuselage in plan view,
wherein
the four or more rotors include:
a pair of first rotors disposed forward of the front wing so as to be bilaterally symmetrical about the position overlapping the central axis of the fuselage in plan view; and
two or more second rotors disposed between the front wing and the rear wing so as to be bilaterally symmetrical about the position overlapping the central axis of the fuselage in the plan view,
a distance between the fuselage and each of the second rotors in a width direction is longer than a distance between the fuselage and each of the first rotors in the width direction,
the pair of bar members are connected to the front wing and the rear wing, are curved outward in the width direction, and support the pair of first rotors and the two or more second rotors, and
a middle portion of each of the pair of bar members between end portions of each of the pair of bar members is located further outward in the width direction of the aircraft than the end portions.

2. The aircraft according to claim 1, wherein
a distance between a pair of second rotors among the two or more second rotors is longer than a distance between the pair of first rotors.

3. The aircraft according to claim 1, wherein
a center of gravity of the aircraft is located between the front wing and the rear wing,
a distance, in a front-rear direction, between the center of gravity and a center position between the pair of second rotors is shorter than a distance, in the front-rear direction, between the center of gravity and a center position between the pair of first rotors.

4. The aircraft according to claim 1, wherein
the rear wing is a swept wing, and
a wing area of the rear wing is larger than a wing area of the front wing, or a wing width of the rear wing is greater than a wing width of the front wing.

5. An aircraft comprising:
a fuselage;
a front wing connected to a front portion of the fuselage and configured to generate lift when the aircraft moves in a horizontal direction;
a rear wing connected to a rear portion of the fuselage and configured to generate lift when the aircraft moves in the horizontal direction;
four or more rotors configured to generate lift;
a pair of bar members disposed so as to be bilaterally symmetrical about a position overlapping a central axis of the fuselage in plan view,
wherein
the four or more rotors include a pair of first rotors and a pair of second rotors, the pair of first rotors and the pair of second rotors each being disposed so as to be bilaterally symmetrical about the position overlapping the central axis of the fuselage in plan view, and
a distance, in a front-rear direction, between a center position of the rear wing and a center position between the pair of second rotors is shorter than a distance, in the front-rear direction, between the center position of the rear wing and a center position between the pair of first rotors, a distance between the fuselage and each of the second rotors in a width direction is longer than a distance between the fuselage and each of the first rotors in the width direction, the pair of bar members are connected to the front wing and the rear wing, are curved outward in the width direction, and support the pair of first rotors and the pair of second rotors, and a middle portion of each of the pair of bar members between end portions of each of the pair of bar members is located further outward in the width direction of the aircraft than the end portions.

6. An aircraft comprising:

a fuselage;

a front wing connected to a front portion of the fuselage and configured to generate lift when the aircraft moves in a horizontal direction;

a rear wing connected to a rear portion of the fuselage and configured to generate lift when the aircraft moves in the horizontal direction;

six or more rotors configured to generate lift; and a pair of bar members disposed so as to be bilaterally symmetrical about a position overlapping a central axis of the fuselage in plan view, wherein the six or more rotors include:

a pair of first rotors disposed forward of the front wing so as to be bilaterally symmetrical about the position overlapping the central axis of the fuselage in plan view;

a pair of second rotors disposed between the front wing and the rear wing so as to be bilaterally symmetrical about the position overlapping the central axis of the fuselage in the plan view; and a pair of third rotors disposed rearward of the rear wing so as to be bilaterally symmetrical about the position overlapping the central axis of the fuselage in the plan view, the pair of bar members are connected to the front wing and the rear wing, are curved outward in the width direction, and support the pair of first rotors, the pair of second rotors, and the pair of third rotors, and a middle portion of each of the pair of bar members between end portions of each of the pair of bar members is located further outward in the width direction of the aircraft than the end portions, and a distance between the pair of second rotors is longer than a distance between the pair of first rotors and a distance between the pair of third rotors.

* * * * *